(12) United States Patent
Edwards et al.

(10) Patent No.: US 12,361,468 B2
(45) Date of Patent: Jul. 15, 2025

(54) MODIFIED ORDERING RECOMMENDATIONS

(71) Applicant: Capital One Services, LLC, McLean, VA (US)

(72) Inventors: Joshua Edwards, Philadelphia, PA (US); Alexander Mireles, Clifton, VA (US); Evans Yeung, Brooklyn, NY (US); Marcelo Salvador Jabif Epsztejn, Arlington, VA (US); Glenn Bewley, New York, NY (US); Lin Ni Lisa Cheng, New York, NY (US)

(73) Assignee: Capital One Services, LLC, McLean, VA (US)

( * ) Notice: Subject to any disclaimer, the term of this patent is extended or adjusted under 35 U.S.C. 154(b) by 211 days.

(21) Appl. No.: 17/714,476

(22) Filed: Apr. 6, 2022

(65) Prior Publication Data

US 2023/0325900 A1 Oct. 12, 2023

(51) Int. Cl.
*G06Q 30/0601* (2023.01)
(52) U.S. Cl.
CPC ..... *G06Q 30/0631* (2013.01); *G06Q 30/0635* (2013.01)
(58) Field of Classification Search
CPC .................. G06Q 30/0631; G06Q 30/0635
See application file for complete search history.

(56) References Cited

U.S. PATENT DOCUMENTS

| 6,611,881 | B1 | 8/2003 | Gottfurcht et al. |
| 8,438,052 | B1 | 5/2013 | Chanda et al. |
| 10,438,276 | B2 * | 10/2019 | Godsey ............. G06Q 30/0635 |
| 11,176,588 | B2 | 11/2021 | Licht et al. |
| 2005/0125281 | A1 | 6/2005 | Henrickson et al. |
| 2008/0015951 | A1 | 1/2008 | Kerker et al. |
| 2014/0180809 | A1 * | 6/2014 | Boal .................. G06Q 30/0269 705/14.49 |
| 2014/0279204 | A1 | 9/2014 | Roketenetz et al. |
| 2017/0262926 | A1 | 9/2017 | High et al. |

(Continued)

FOREIGN PATENT DOCUMENTS

KR 20230101341 A * 7/2023

OTHER PUBLICATIONS

Wang Qiuzhen, Xu Jing and Liu Jun, "Group purchase: A win-win combination of social networking services with e-commerce typical representative—Nuomi.com," The 2nd International Conference on Information Science and Engineering, Hangzhou, 2010, pp. 2111-2114, doi: 10.1109/ICISE.2010.5690376. (Year: 2010).*

*Primary Examiner* — Michelle T Kringen
(74) *Attorney, Agent, or Firm* — Foley & Lardner LLP (57) ABSTRACT

Disclosed embodiments may include systems and methods for providing modified order recommendations. Line item data from a set of transactions associated with a vendor can be collected. The line item includes transactional data such as price, quantity, and frequency. The set of transactions are associated with a plurality of customers of the vendor. Correlations between line item data can be determined via one or more machine learning techniques to train a recommendation model. An order recommendation to a customer can be determine based on the correlations of the recommendation model. An order of the customer can be modified according to the order recommendation.

19 Claims, 6 Drawing Sheets

(56) References Cited

U.S. PATENT DOCUMENTS

| | | |
|---|---|---|
| 2017/0287044 A1 | 10/2017 | Rose et al. |
| 2018/0260875 A1 | 9/2018 | Jayaraman et al. |
| 2019/0236637 A1 | 8/2019 | Kumar et al. |
| 2020/0279219 A1* | 9/2020 | Desai .................... G06F 16/355 |
| 2023/0031874 A1* | 2/2023 | Goldfield .............. G06F 3/0482 |

* cited by examiner

MODIFIED ORDERING RECOMMENDATIONS

BACKGROUND

Ordering from vendors is typically a blind transaction. There is little information that a customer can access to find available price points, in particular for bulk discounts. Customers can negotiate and/or accept pricing through a vendor where the only information regarding pricing comes from the vendor themselves. It is up to the customer to negotiate an acceptable price for products sold by the vendor. Many times, the vendor offers different price points based on quantity and the discounts are not always conveyed to the customer. Other times, the vendor may offer different price points to different customers such that one customer pays more than another customer for the same price and quantity.

BRIEF SUMMARY OF THE DESCRIPTION

The following presents a summary of the present disclosure in order to provide a basic understanding of disclosed embodiments herein. This summary is not an extensive overview of the present disclosure. It is not intended to identify key/critical elements of the present disclosure or to delineate the scope of the present disclosure. Its sole purpose is to present some concepts of the present disclosure in a simplified form as a prelude to the more detailed description that is presented later.

The present disclosure disclosed and claimed herein, in one aspect thereof, comprises systems and methods of modified order recommendations. Line item data from a set of transactions associated with a vendor can be collected. The line item includes transactional data such as price, quantity, and frequency. The set of transactions are associated with a plurality of customers of the vendor. Correlations between line item data can be determined via one or more machine learning techniques to train a recommendation model. An order recommendation to a customer can be determined based on the correlations of the recommendation model. An order of the customer can be modified according to the order recommendation.

In aspects, the subject disclosure provides substantial benefits in terms of modified order recommendations. One advantage resides in an expanded knowledgebase of vendor pricing. Another advantage resides leveraging new data to achieve savings for a customer.

To the accomplishment of the foregoing and related ends, certain illustrative aspects of the present disclosure are described herein in connection with the following description and the annexed drawings. These aspects are indicative, however, of but a few of the various ways in which the principles of the present disclosure can be employed and the subject disclosure is intended to include all such aspects and their equivalents. Other advantages and novel features of the present disclosure will become apparent from the following detailed description of the present disclosure when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

The present disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the present disclosure can be practiced without these specific details. In other instances, well-known structures and devices are shown in block diagram form in order to facilitate describing the present disclosure.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 1:
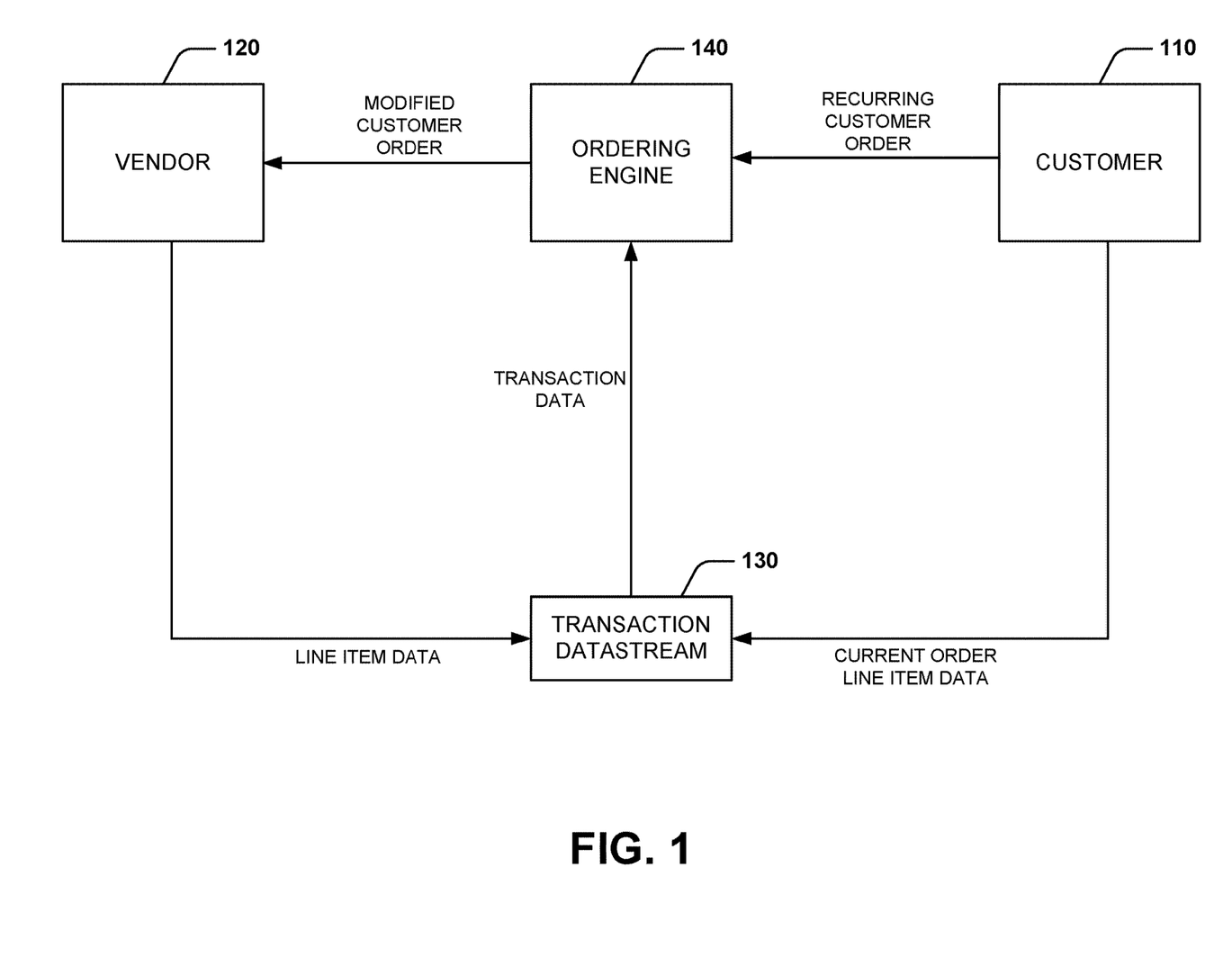
FIG. 1 illustrates a high level diagram of the subject disclosure according to aspects described herein.

FIG. 1 illustrates a high level view of the subject disclosure according to aspects herein. A customer 110 can order or transact with a vendor 120. In some embodiments, the customer 110 can be a customer interface, computer system associated with a customer of the vendor, a website of the customer, an ordering system of the customer, and/or the like. In some embodiments, the vendor 120 can be vendor ordering system, a website or portal associated with a vendor, the customer interface provided by the vendor, and/or the like. The customer 110 can negotiate a price for goods and/or services with the vendor 120. The customer 110 and the vendor 120 can typically agree on a price based on quantity, recurrence frequency, location, special orders, and/or other factors. In some embodiments, the customer 110 can utilize a commercial credit card(s) or commercial credit card account(s) associated with a financial institution to complete payments and/or orders with the vendor 120. In some embodiments, the customer 110 can interact with a vendor ordering system or interface of the vendor 120 to complete payments, submit orders, change orders, and/or the like.

Disclosed embodiments may include a transaction data stream 130. The transaction data stream 130 may be a stream of data that can include one or more entries of data corresponding to purchases, sales, and/or other transactions. In some embodiments, when a customer 110 generates an order with the vendor 120, the order is provided to a transaction data stream 130. The vendor 120 can provide transaction data between other customers and the vendor 120 to the transaction data stream 130. The vendor 120 can be a common vendor between a plurality of customers. The transaction data stream 130 can collect transaction data of the vendor 120 and the customer 110. In some embodiments, the transaction data stream 130 receives line item data. The line item data can include commercial data regarding a particular transaction. In some embodiments, the line item data includes level three processing data associated with a credit card, credit card account(s), commercial credit card(s), or commercial credit card account(s) associated with a commercial customer(s) via a financial institution. The line item data for a transaction can include but not limited to: freight amount (e.g. freight or shipping/handling charges), duty amount (e.g. import or export charges), discount amount (e.g. amount of discount applied to total order and line items), product code, product description (e.g. a text or audio/visual description of the item), quantity (e.g. units of items purchased), unit of measure (e.g. metric for quantity), unit cost (e.g. cost of measurable unit as per the unit of measure), item commodity code (e.g. used to segment and manage spending), sales tax (e.g. tax amount, rate, and type), line item total (e.g. calculated as price times quantity), customer reference number (e.g. unique identifier used to track order), and/or the like.

Disclosed embodiments may include one or more of an ordering engine 140. The ordering engine 140 may be a computer system. In some embodiments, the customer 110 can provide the ordering engine 140 with line item data and/or transaction data. The ordering engine 140 can access or interface with the transaction data stream 130 to retrieve or receive line item data of transactions made by the vendor 120 and other customers. The ordering engine 140 can receive the line item data in real time or near real time.

The ordering engine 140 can analyze the transaction data and/or line item data across different customers, products, services, locations, and/or the like. The ordering engine 140 analyzes the line item data in comparison to line item data of transactions between the customer 110 and the vendor 120. The ordering engine 140 can compare discount data, price data, and/or quantity data of the line item data to determine whether a different customer(s) is receiving a bulk order discount from the vendor 120. The ordering engine 140 can determine a recommendation based on the comparison. For example, the ordering engine 140 can determine an order of the customer 110 is inefficient (e.g. the customer 110 is paying a higher unit cost for a product than another customer) or that the customer 110 has generated previous orders that have not met or satisfied a set of circumstances to receive a discount (e.g. the customer has not ordered enough units in a single order). The ordering engine 140 can determine that if the customer 110 increases quantity of an order while decreasing frequency, the order or order recommendation of the customer 110 can be optimized to satisfy the set of circumstances to take advantage of a bulk order price offered by the vendor 120 to the other customer.

In some embodiments, the ordering engine 140 determines a recommendation model based on the analysis. The recommendation model can be invoked to provide recommendations to the customer based on a present set of inputs. For example, the recommendation model can be invoked by the ordering engine 140 for an output of an order recommendation for a recurring order of the customer 110 based on line item data that is input to the recommendation model upon invocation.

The ordering engine 140 can train the recommendation model via the line item data associated with the vendor 120. The ordering engine 140 can utilize a machine learning technique to determine correlations between price, quantity, product type, discounts, and/or other line item data. The recommendation model can determine the trends and/or correlations within the line item data. The recommendation model can determine a recommendation based on the trends and the line item data of the customer 110. The recommendation can be a modified order for the customer 110 for a product(s) or service(s) provided by the vendor 120.

In some embodiments, the ordering engine 140 can interface with a vendor order system or sales system associated with the vendor 120. The ordering engine 140 can automatically modify an order of the customer 110 via interfacing with the vendor 120. In some embodiments, the ordering engine 140 can detect a requested debit to the customer 110 from the vendor 120. The ordering engine 140 can determine no modification according to the order recommendation has been implemented. The ordering engine 140 can block the requested debit based on the order recommendation not being followed. For example, the ordering engine 140 can reject a payment to the vendor 120 on a commercial credit card of the customer 110.

Figure 2:
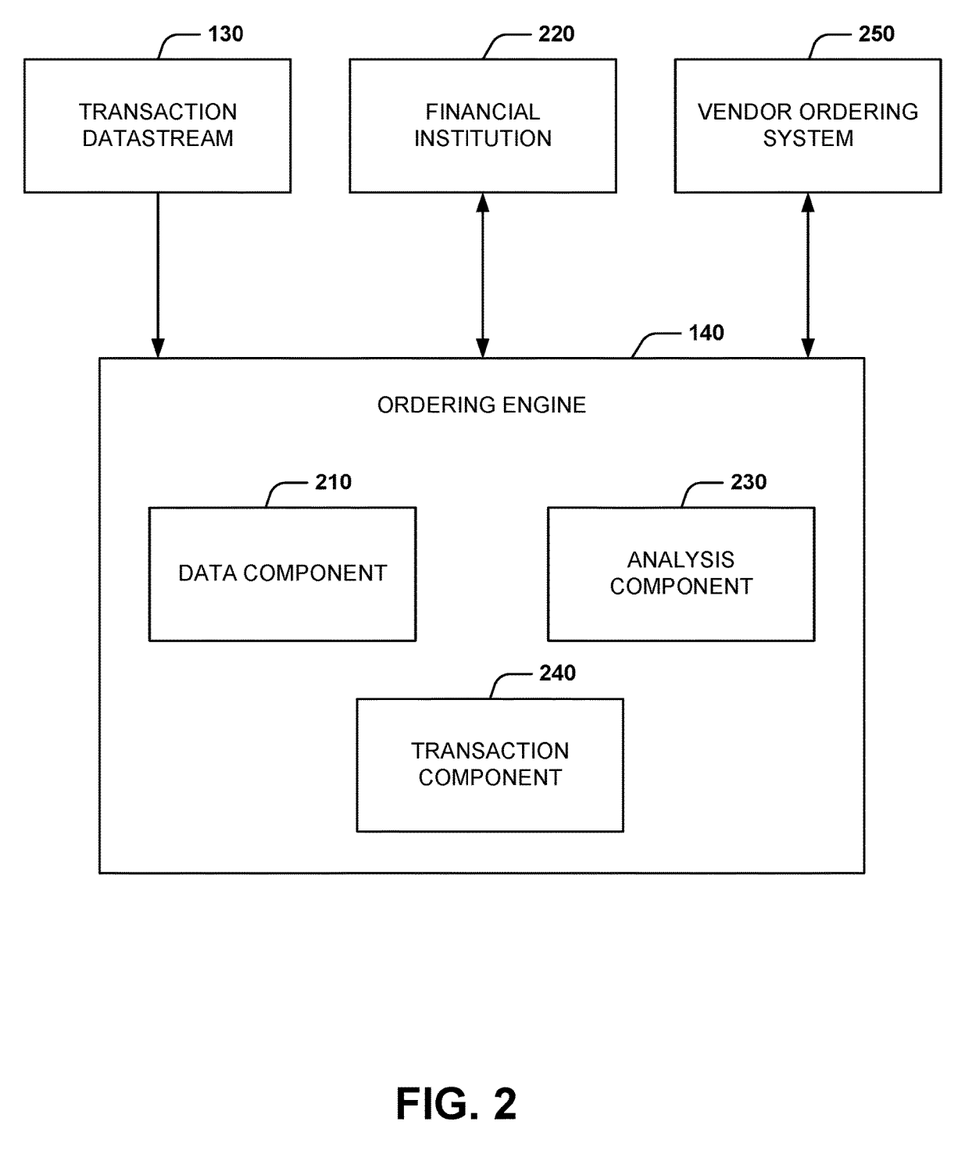
FIG. 2 illustrates an example component diagram of an ordering engine.

FIG. 2 illustrates a detailed component diagram of the ordering engine 140. The ordering engine 140 includes a data component 210. The data component 210 can be executed via a hardware processor, a software module, software machine, a combination, and/or the like. The data component 210 can ingest transaction data from a transaction data stream 130. When the customer 110 generates an order with the vendor 120, the order is provided to the transaction data stream 130. The vendor 120 can provide transaction data with other customers to the transaction data stream 130 which can be accessed by the data component 210 of the ordering engine 140. The data component 210 can receive line item data from the transaction data stream 130. In some embodiments, the data component 210 can receive transaction data and parse the transaction data into the line item data.

The line item data can include commercial data regarding a particular transaction. In some embodiments, the line item data includes level three processing data associated with a credit card or commercial credit card associated with a commercial customer via a financial institution 220. In some embodiments, the data can be retrieved from a database, data store, computer system, and/or the like that is associated with the financial institution 220. The line item data for a transaction can include but limited to: freight amount (e.g. freight or shipping/handling charges), duty amount (e.g. import or export charges), discount amount (e.g. amount of discount applied to total order and line items), product code, product description (e.g. a text or audio/visual description of the item), quantity (e.g. units of items purchased), unit of measure (e.g. metric for quantity), unit cost (e.g. cost of measurable unit as per the unit of measure), item commodity code (e.g. used to segment and manage spending), sales tax (e.g. tax amount, rate, and type), line item total (e.g. calculated as price times quantity), customer reference number (e.g. unique identifier used to track order), and/or the like.

In some embodiments, the data component 210 can receive order information and/or transaction data from the customer 110 and/or a customer device (not shown). The data component 210 can access or interface with the transaction data stream 130 to receive line item data of transactions made by the vendor 120. The data component 210 can receive the line item data in real time or near real time.

The ordering engine 140 includes an analysis component 230. The analysis component 230 can be executed via a hardware processor, a software module, software machine, a combination, and/or the like. The analysis component 230 can analyze the transaction data and/or line item data across different customers, products, services, locations, and/or the like via a configured processor that processes data. For example, the analysis component 230 calculates metrics across different data groups within the line item data. For example, the metrics, as a result of the analysis of the line item data, can be average unit price for a quantity tier (e.g. orders over 100 units vs. orders under 100 units). The analysis component determines the metrics to aid a comparison. The analysis component 230, via the configured processor, compares the line item data to line item data of transactions between the customer 110 and the vendor 120. The analysis component 230 can compare discount data, price data, and/or quantity data of the line item data to determine whether a different customer is receiving a bulk order discount from the vendor 120 as a result of the analysis. The analysis component 230 can determine a recommendation based on the comparison. For example, the analysis component 230 can determine results of analyzing the data that an inefficient price that the customer 110 is paying to the vendor 120 for a product based on other customers receiving a bulk discount at a higher order quantity than the customer 110. The analysis component 230 can determine a recommendation that if the customer 110 increases quantity of an order while decreasing frequency to maintain the customer's total number of units ordered, that the customer 110 can take advantage of a bulk order price offered by the vendor 120 to other customers.

In some embodiments, the analysis component 230 determines and/or trains a recommendation model based, in part, on the result of the analysis. The analysis component 230 can train the recommendation model via the line item data associated with the vendor 120 and/or the results of the analysis. The analysis component 230, via a configured processor, can utilize a machine learning technique to determine trends between price, quantity, product type, discounts, and/or other line item data. The recommendation model can determine the trends and/or correlations within the line item data. For example, the recommendation model can determine discount trends between customers of the vendor such as a quantity trend that receives a discount. The recommendation model can determine a recommendation based on the trends and the line item data of the customer 110. The recommendation can be a modified order for the customer 110 for a product(s) or service(s) provided by the vendor 120.

In some embodiments, the analysis component 230, via the configured processor, determines an average or median price and/or median discount for a quantity level of a product. The analysis component 230 can calculate the average or median unit pricing of different orders in the transaction data stream (e.g. dividing an order quantity with a total price to determine a unit price). The analysis component 230, via the configured processor, can invoke the recommendation model to utilize the average or median pricing to determine a general discount at a certain quantity level to determine whether a discount exists for the quantity level. For example, the recommendation model can be invoked by the configured processor with the unit price and transaction data of the vendor from the transaction data stream as inputs. The recommendation model can determine a trend based on analyzing the quantity and/or the unit price across different customers of the vendor. The recommendation model determines that a trend of customers that order over 100 units receive a unit price lower than customer that order less than 100 units. For example, the analysis component 230 can determine a bulk discount if an average unit price at 100 units is lower than an average unit price at 10 units.

In some embodiments, the recommendation model can determine a group of customers that can combine orders to take advantage of a bulk discount. For example, the analysis component 230 can determine that a bulk discount trend at 100 units via the recommendation model. The analysis component 230 can determine two customers that are ordering 60 units and 40 units respectively and can create an ordering group. The customers can opt into the group such that their orders can be batched and receive the bulk discount from the vendor 120. In some embodiments, the customers can organize delivery and/or exchange of the products. In other embodiments, the analysis component 230 can determine one customer that is better suited to receive the group order. For example, the customer that is receiving more product (e.g. the 60 ordering customer) may be better suited to receive the group order. The analysis component 230 can automatically organize the exchange of the non-receive customer's order. For example, the analysis component 230 can automatically schedule a pickup and delivery of the non-receiving customer's order by a shipping carrier.

In some embodiments, the analysis component 230 can factor in qualities of the product being ordered to determine an optimized order recommendation. For example, the analysis component 230 can factor perishability of the product to optimize a bulk order recommendation for the customer 110. In some embodiments, the analysis component 230 can factor timing vs. price aspects of the product being ordered. For example, if nuts and bolts are more expensive near the beginning of the year, the analysis component 230 can recommend purchasing in bulk later in the year. In some embodiments, the analysis component 230 can factor temperature and/or climate restrictions. For example, the analysis component 230 can factor location of the customer 110, time of year, and nature of the product to determine whether a bulk order or increase order can be stored in a conventional manner or whether climate controlled solution will be needed. In some embodiments, the factors can affect whether a bulk order should be recommended to the customer 110.

In some embodiments, the ordering engine 140 includes a transaction component 240. The transaction component 240 can be executed via a hardware processor, a software module, software machine, a combination, and/or the like. The transaction component 240 can interface with a vendor ordering system 250 associated with the vendor 120. The transaction component 240 can automatically change an order of the customer 110 via interfacing with the vendor 120. The transaction component 240 can change an order to a recommended order for the customer automatically. In some embodiments, the transaction component 240 can generate and send a notification to the customer 110 to accept/deny a modification to the order or to opt into automatic order modifications based on a recommendation of the analysis component 230.

In some embodiments, the transaction component 240 can detect a requested debit to the customer 110 from the vendor 120. The transaction component 240 can determine no modification according to the modified order recommendation has been implemented. The transaction component 240 can block the requested debit based on the order recommendation not being followed. For example, the transaction component 240 can reject a payment to the vendor 120 on a commercial credit card of the customer 110.

Figure 3:
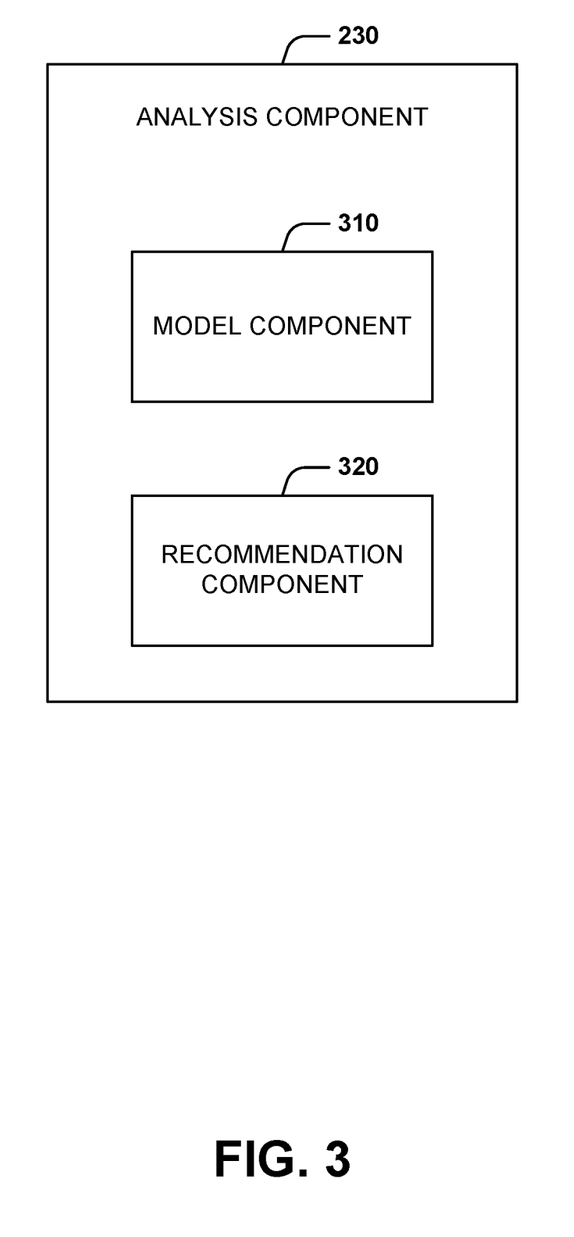
FIG. 3 illustrates an example component diagram of an analysis component.

FIG. 3 illustrates a detailed component diagram of the analysis component 230. The analysis component 230 includes a model component 310. The model component 310 determines a recommendation model based on analysis of transaction data and/or line item data. The model component 310 can train the recommendation model via the line item data associated with the vendor 120. The model component 310 can utilize a machine learning technique to determine trends between price, quantity, product type, discounts, and/or other line item data across a customer base of the vendor 120. The model component learns from existing data to make predictions about new order data for the customer 110. The model component 310 builds the recommendation model from the transaction data stream 130 (e.g. "training data set") in order to make data-driven predictions or decisions expressed as outputs or assessments for the customer 110 or current/upcoming order of the customer 110. The model component 310 can determine the trends and/or correlations within the line item data. In some embodiments the model component 310 utilizes the machine learning technique to analyze the transaction data and/or line item data across different customers, products, services, locations, and/or the like to determine a recommendation model based on correlations in order data from the transaction data stream 130.

The analysis component includes a recommendation component 320. The recommendation component 320 applies or invokes the recommendation model to a current or upcoming order of the customer 110 to determine a recommendation based on the trends revealed by the machine learning and the line item data of the customer 110. The recommendation component 320 via the recommendation model can determine an output as a modified order for the customer 110 for a product(s) or service(s) provided by the vendor 120.

In some embodiments, the recommendation component 320 via the recommendation model determines an average or median price and/or median discount for a quantity level of a product. The recommendation component 320 can utilize the average or median pricing to determine a general discount at a certain quantity level to determine whether a discount exists for the quantity level. For example, the recommendation component 320 can determine a bulk discount if an average unit price at 100 units is lower than an average unit price at 10 units.

In some embodiments, the recommendation component 320 via the recommendation model can determine a group of customers that can combine orders to take advantage of a bulk discount. For example, the recommendation component 320 can determine that a bulk discount is available for 100 units via the recommendation model. The recommendation component 320 can determine two customers that are ordering 60 units and 40 units respectively and can create an ordering group. The customers can opt into the group such that their orders can be batched and receive the bulk discount from the vendor 120. In some embodiments, the customers can organize delivery and/or exchange of the products. In other embodiments, the recommendation component 320 can determine one customer that is better suited to receive the group order. For example, the customer that is receiving more product (e.g. the 60 ordering customer) may be better suited to receive the group order. The recommendation component 320 can automatically organize the exchange of the non-receive customer's order. For example, the recommendation component 320 can automatically schedule a pickup and delivery of the non-receiving customer's order by a shipping carrier.

In some embodiments, the recommendation component 320 via the recommendation model can factor in cross vendor transactions to determine whether the customer 110 can receive a better price from a different vendor. The recommendation component 320 can determine a mapping model of equivalent products between vendors. For example, units may be sold in distinct quantity packs. The recommendation component 320 can factor the quantity packs and unit costs in determining whether a different vendor should be considered by the customer 110.

The recommendation component 320 can determine a recommendation based on a comparison of line item data. For example, the recommendation component 320 can determine an inefficient price or sub-optimal price that the customer 110 is paying to the vendor 120 for a product. The recommendation component 320 can determine that if the customer 110 increases quantity of an order while decreasing frequency, the customer 110 can take advantage of a bulk order price offered by the vendor 120 to other customers.

In some embodiments, the recommendation component 320 via the recommendation model analyzes the line item data in comparison to line item data of transactions between the customer 110 and the vendor 120. The recommendation component 320 can compare discount data, price data, and/or quantity data of the line item data to determine whether a different customer is receiving a bulk order discount from the vendor 120.

In some embodiments, the recommendation component 320 via the recommendation model can factor in qualities of the product being ordered. For example, the recommendation component 320 can factor perishability of the product to optimize a bulk order recommendation for the customer 110. In some embodiments, the recommendation component 320 can factor timing vs. price aspects of the product being ordered. For example, pumpkins may be more expensive in autumn months, the recommendation component 320 can recommend purchasing pumpkins in bulk outside of the autumn months. In some embodiments, the recommendation component 320 can factor temperature and/or climate restrictions. For example, the recommendation component 320 can factor location of the customer 110, time of year, and nature of the product to determine whether a bulk order or increase order can be stored in a conventional manner or whether climate controlled solution is preferred. The factors can affect whether a bulk order should be recommended to the customer 110.

Figure 4:
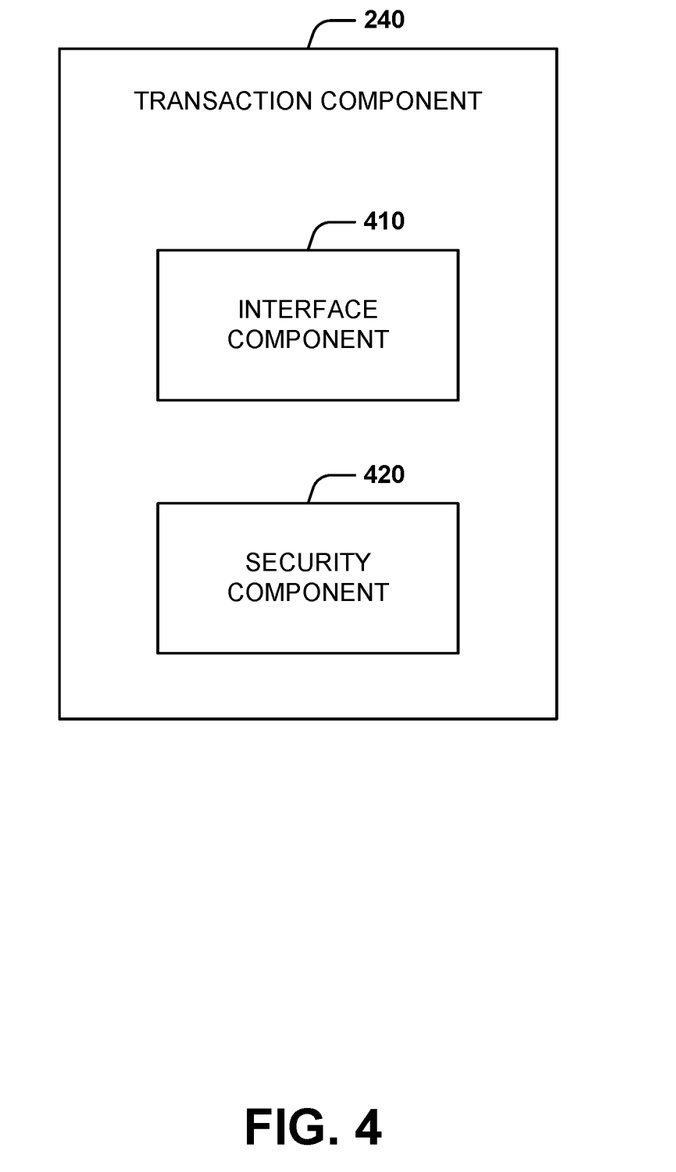
FIG. 4 illustrates an example component diagram of a transaction component.

FIG. 4 illustrates a detailed component diagram of a transaction component 240. The transaction component 240 includes an interface component 410. The interface component 410 can interface with a vendor ordering system associated with the vendor 120. The interface component 410 can access a vendor ordering system 250 remotely via a network, internet, wireless network, server, communications protocol, application programming interface, and/or the like. For example, the interface component 410 can utilize an application programming interface call and response to retrieve data, execute functions, and/or the like with the vendor ordering system 250.

The interface component 410 can automatically change an order of the customer 110 via interfacing with the vendor 120. The interface component 410 can change an order to a recommended order for the customer automatically. In some embodiments, the interface component 410 can generate and send a notification to a customer device of the customer 110 to accept/deny a change to the order or to opt into automatic order changes based on a recommendation of the analysis component 230.

In some embodiments, the transaction component 240 includes a security component 420. The security component 420 can detect a requested debit to the customer 110 from the vendor 120. The security component 420 can determine no modification according to the modified order recommendation has been implemented. The security component 420 can block the requested debit based on the order recommendation not being followed. For example, the security component 420 can reject a payment to the vendor 120 on a commercial credit card of the customer 110.

In some embodiments, the security component 420 can institute a temporary hold on the transaction until the vendor 120 has rectified the new order to follow the recommendation. The security component 420 can access the financial institution 220 to hold transactions to a commercial credit card associated with the customer 110. The security component 420 can permit the transaction upon confirming the order matches the recommendation.

Figure 5:
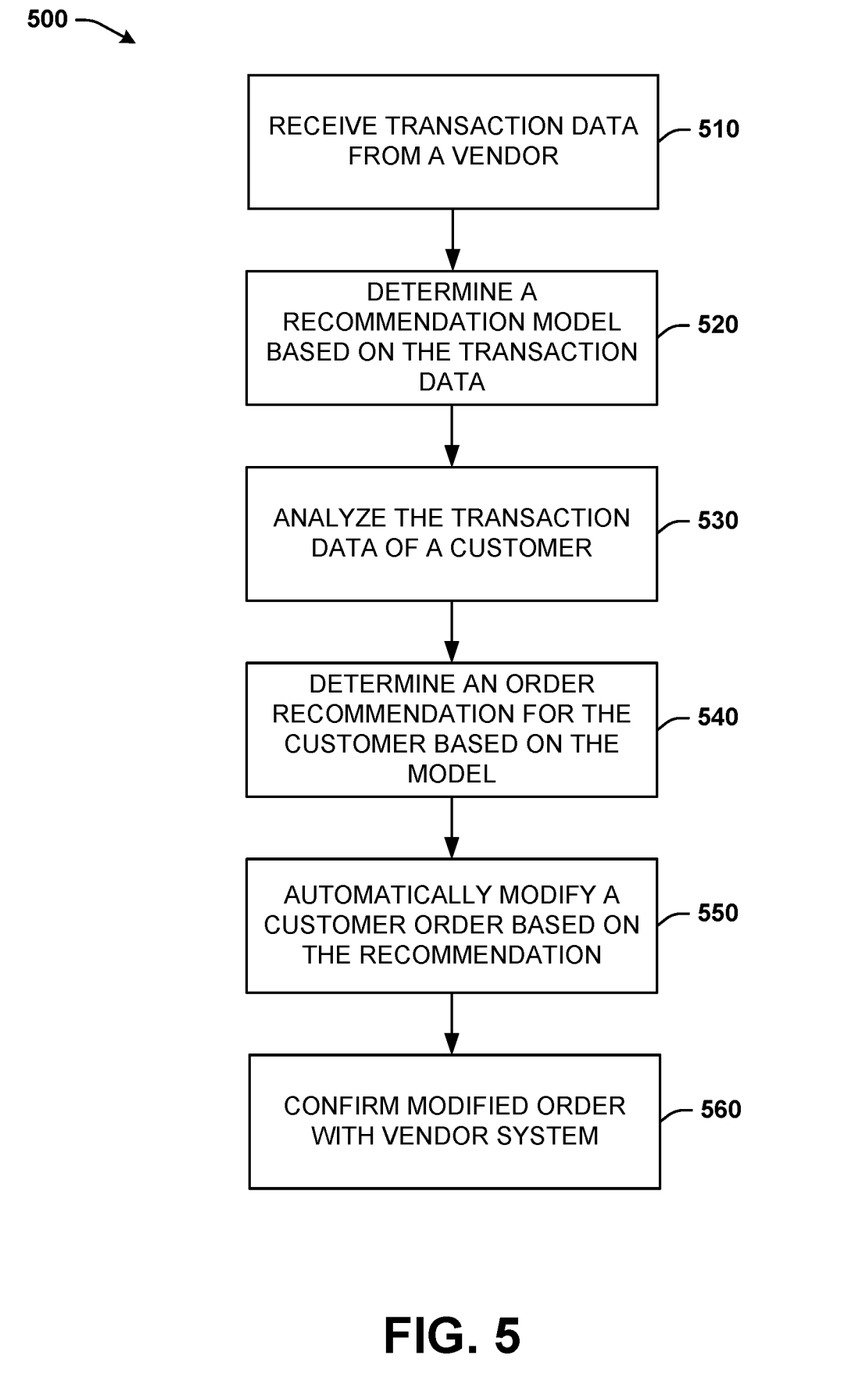
FIG. 5 illustrates a method for modified ordering recommendations.

With reference to FIG. 5, example method 500 is depicted for modified ordering recommendations. While, for purposes of simplicity of explanation, the one or more methodologies shown herein, e.g., in the form of a flow chart, are shown and described as a series of acts, it is to be understood and appreciated that the subject disclosure is not limited by the order of acts, as some acts may, in accordance with the present disclosure, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present disclosure. It is also appreciated that the method 500 are described in conjunction with a specific example is for explanation purposes.

FIG. 5 illustrates a method 500 for modified ordering recommendations. At 510, transaction data is received from a vendor 120. For example, the vendor 120 provides line item data of orders and/or transactions of sales completed. The line item data includes price, units, quantity, product codes, and/or the like. At 520, a recommendation model is determined based on the line item data. The recommendation model can be determine using a machine learning technique or algorithm that determines correlations between line item data. For example, a correlation between price and quantity can be determined by the machine learning technique and trained for the recommendation model. At 530, transaction data of the customer 110 is analyzed. The transaction data of the customer can include line item data. For example, line item data of the customer 110 can be input into the recommendation model.

At 540, an order recommendation can be determined by the recommendation model for the customer 110. The order recommendation can be a bulk order or quantity recommendation. The recommendation can be to modify ordering practices of the customer 110 such as quantity, frequency of order, and/or the like. At 550, an order of the customer 110 can be automatically changed. The order can be a recurring or upcoming order of the customer 110. The order can be modified according to the order recommendation from the recommendation model. At 560, the modified order can be confirmed. A transaction component 240 can determine that the vendor has not modified the order of the customer 110. The transaction component 240 can block the order until it is modified by the vendor 120.

The present disclosure disclosed and claimed herein, in one aspect thereof, comprises systems and methods of modified ordering recommendations. A method of the present disclosure can include receiving an order for a product from a customer; analyzing a set of transaction data from a transaction data stream that includes data associated with a plurality of customers that ordered the product, wherein the set of transaction data includes order price, quantity, and frequency; training a recommendation model based on a result of the analysis of the transaction data; and invoking the recommendation model to determine an order recommendation for the customer.

Disclosed embodiments may include systems that can include a processor coupled to a memory that includes instructions executed by the processor. The instructions can include receive an order for a product from a customer; retrieve a set of transaction data in near real time via a transaction data stream that includes data associated with a plurality of customers that ordered the product, wherein the set of transaction data includes order price, quantity, and frequency; train a recommendation model using the set of transaction data as a training data set; and invoke the recommendation model to determine an order recommendation to the customer.

A method of the present disclosure can include receiving an upcoming order for a product from a customer; collecting line item data from a set of transaction data, wherein the line item data includes price data and quantity data associated with a plurality of customers of a vendor; training a recommendation model to determine correlations of the line item data; invoking the recommendation model to determine a bulk order recommendation to a customer based on the correlations of the line item data; determining the upcoming order is a recurring order of the customer, wherein the recurring order includes a frequency, a price, and a quantity; and automatically modifying the recurring order according to the bulk order recommendation, wherein the bulk order recommendation modifies at least one of the quantity or the frequency of the recurring order to affect the price.

As used herein, the terms "component" and "system," as well as various forms thereof (e.g., components, systems, sub-systems) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 6:
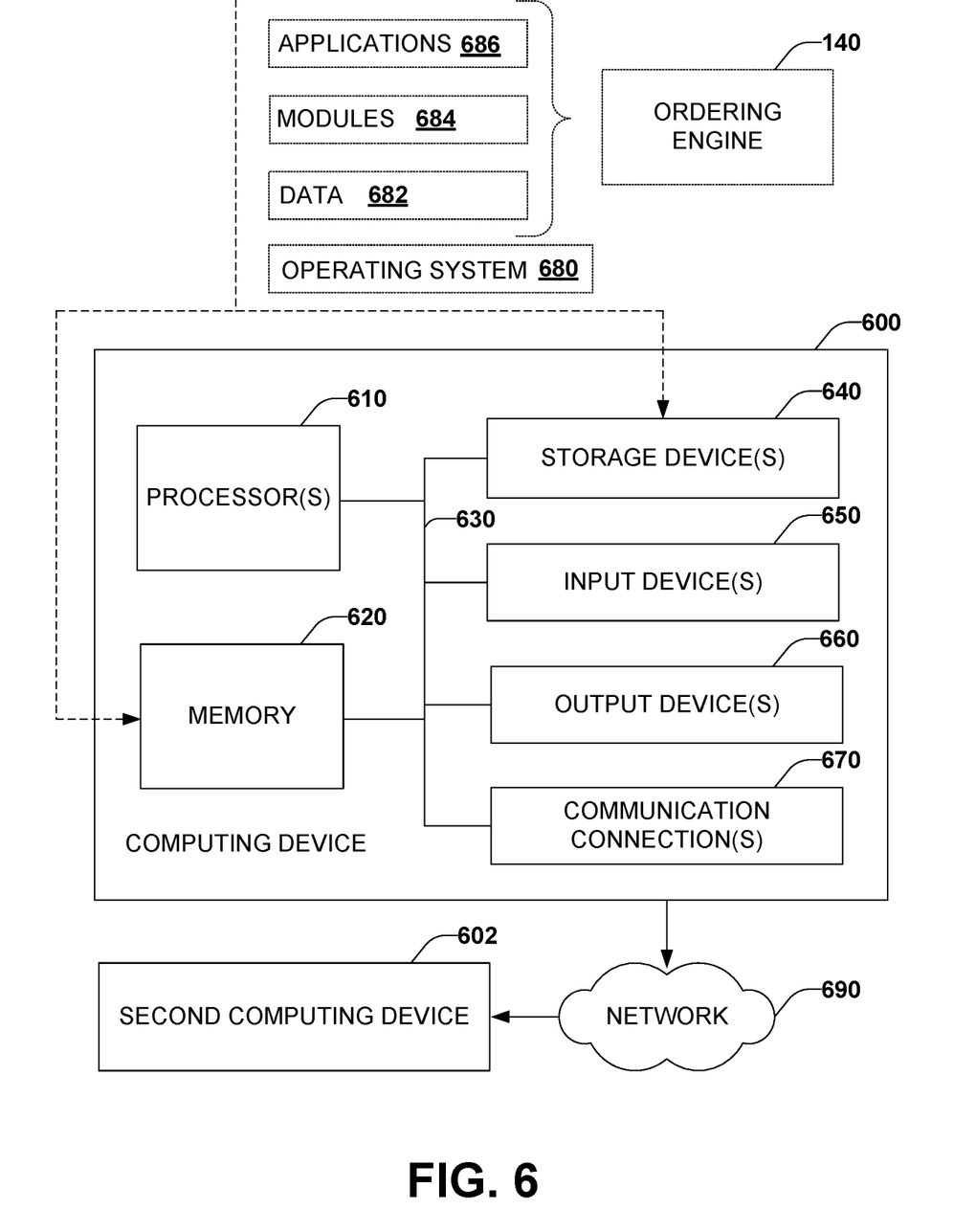
FIG. 6 illustrates a computing environment where one or more of the provisions set forth herein can be implemented, according to some embodiments.

To provide a context for the disclosed subject matter, FIG. 6 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 6, illustrated is an example computing device 600 (e.g., desktop, laptop, tablet, watch, server, hand-held, programmable consumer or industrial electronics, set-top box, game system, compute node . . . ). The computing device 600 includes one or more processor(s) 610, memory 620, system bus 630, storage device(s) 640, input device(s) 650, output device(s) 660, and communications connection(s) 670. The system bus 630 communicatively couples at least the above system constituents. However, the computing device 600, in its simplest form, can include one or more processors 610 coupled to memory 620, wherein the one or more processors 610 execute various computer executable actions, instructions, and or components stored in the memory 620.

The processor(s) 610 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 610 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 610 can be a graphics processor unit (GPU) that performs calculations with respect to digital image processing and computer graphics.

The computing device 600 can include or otherwise interact with a variety of computer-readable media to facilitate control of the computing device to implement one or more aspects of the disclosed subject matter. The computer-readable media can be any available media that is accessible to the computing device 600 and includes volatile and nonvolatile media, and removable and non-removable media. Computer-readable media can comprise two distinct and mutually exclusive types, namely storage media and communication media.

Storage media includes volatile and nonvolatile, removable, and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM), magnetic storage devices (e.g., hard disk, floppy disk, cassettes, tape, optical disks (e.g., compact disk (CD), digital versatile disk (DVD), and solid state devices (e.g., solid state drive (SSD), flash memory drive (e.g., card, stick, key drive)), or any other like mediums that store, as opposed to transmit or communicate, the desired information accessible by the computing device 600. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 620 and storage device(s) 640 are examples of computer-readable storage media. Depending on the configuration and type of computing device, the memory 620 may be volatile (e.g., random access memory (RAM)), non-volatile (e.g., read only memory (ROM), flash memory) or some combination of the two. By way of example, the basic input/output system (BIOS), including basic routines to transfer information between elements within the computing device 600, such as during start-up, can be stored in nonvolatile memory, while volatile memory can act as external cache memory to facilitate processing by the processor(s) 610, among other things.

The storage device(s) 640 include removable/non-removable, volatile/non-volatile storage media for storage of vast amounts of data relative to the memory 620. For example, storage device(s) 640 include, but are not limited to, one or more devices such as a magnetic or optical disk drive, floppy disk drive, flash memory, solid-state drive, or memory stick.

Memory 620 and storage device(s) 640 can include, or have stored therein, operating system 680, one or more applications 686, one or more program modules 684, and data 682. The operating system 680 acts to control and allocate resources of the computing device 600. Applications 686 include one or both of system and application software and can exploit management of resources by the operating system 680 through program modules 684 and data 682 stored in the memory 620 and/or storage device(s) 640 to perform one or more actions. Accordingly, applications 686 can turn a general-purpose computer 600 into a specialized machine in accordance with the logic provided thereby.

All or portions of the disclosed subject matter can be implemented using standard programming and/or engineering techniques to produce software, firmware, hardware, or any combination thereof to control the computing device 600 to realize the disclosed functionality. By way of example and not limitation, all or portions of the ordering engine 140 can be, or form part of, the application 686, and include one or more modules 684 and data 682 stored in memory and/or storage device(s) 640 whose functionality can be realized when executed by one or more processor(s) 610.

In accordance with one particular embodiment, the processor(s) 610 can correspond to a system on a chip (SOC) or like architecture including, or in other words integrating, both hardware and software on a single integrated circuit substrate. Here, the processor(s) 610 can include one or more processors as well as memory at least similar to the processor(s) 610 and memory 620, among other things. Conventional processors include a minimal amount of hardware and software and rely extensively on external hardware and software. By contrast, an SOC implementation of processor(s) 610 may be more powerful, as such an implementation may embed hardware and software that enable particular functionality with minimal or no reliance on external hardware and software. For example, the ordering engine 140 and/or functionality associated therewith can be embedded within hardware in a SOC architecture.

The input device(s) 650 and output device(s) 660 can be communicatively coupled to the computing device 600. By way of example, the input device(s) 650 can include a pointing device (e.g., mouse, trackball, stylus, pen, touch pad), keyboard, joystick, microphone, voice user interface system, camera, motion sensor, and a global positioning satellite (GPS) receiver and transmitter, among other things. The output device(s) 660, by way of example, can correspond to a display device (e.g., liquid crystal display (LCD), light emitting diode (LED), plasma, organic light-emitting diode display (OLED)), speakers, voice user interface system, printer, and vibration motor, among other things. The input device(s) 650 and output device(s) 660 can be connected to the computing device 600 by way of wired connection (e.g., bus), wireless connection (e.g., Wi-Fi, Bluetooth), or a combination thereof.

The computing device 600 can also include communication connection(s) 670 to enable communication with at least a second computing device 602 by means of a network 690. The communication connection(s) 670 can include wired or wireless communication mechanisms to support network communication. The network 690 can correspond to a local area network (LAN) or a wide area network (WAN) such as the Internet. The second computing device 602 can be another processor-based device with which the computing device 600 can interact. For example, the computing device 600 can correspond to a server that executes functionality of ordering engine 140, and the second computing device 602 can be a user device that communicates and interacts with the computing device 600.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system comprising:
one or more processors and non-transitory media storing instructions that, when executed by the one or more processors, cause operations comprising:
analyzing a set of transaction data from a transaction data stream that includes data associated with a plurality of customers that ordered a product, wherein the set of transaction data includes, order quantity, order frequency, and order price;
training a recommendation model based on a result of analyzing of the set of transaction data, wherein the recommendation model is trained to identify, for a vendor of a plurality of vendors, quantities and frequencies for recurring orders that result in lower prices from the vendor;
in response to detecting a recurring order, of a customer, comprising a customer-approved quantity of the product, a customer-approved frequency of the recurring order, and a customer-approved price per unit of the product, inputting the recurring order into the recommendation model to obtain an order recommendation comprising (i) the customer-approved frequency of the recurring order as a recommended frequency and (ii) a recommended quantity and a recommended price, for each instance of a modified recurring order associated with both the customer and an other customer, that are respectively different from the customer-approved quantity and the customer-approved price in the recurring order; and
in place of the detected recurring order and an other order of the other customer, transmitting, to a vendor system associated with the vendor, the modified recurring order comprising (i) the recommended frequency and (ii) the recommended quantity, and the recommended price that are respectively different from the customer-approved quantity and the customer-approved price in the recurring order.

2. The system of claim 1, the operations further comprising:
in response to (i) transmitting the modified recurring order to the vendor system and (ii) detecting processing of a transaction event for the recurring order, blocking the transaction event to prevent the processing of the transaction event from completing.

3. The system of claim 1, the operations further comprising:
in response to (i) transmitting the modified recurring order to the vendor system and (ii) detecting processing of a transaction event for the recurring order, initiating a hold on the transaction event to temporarily pause the processing of the transaction event.

4. The system of claim 1, wherein obtaining the order recommendation comprises:
invoking the recommendation model to compare the recurring order of the customer with the set of transaction data;

determining, based on comparing the recurring order with the set of transaction data, an optimized order recommendation for the customer; and notifying the customer of the optimized order recommendation.

5. The system of claim 4, wherein the optimized order recommendation is a determined bulk price that is not paid by the customer.

6. The system of claim 1, wherein transmitting the modified recurring order comprises:

automatically modifying, via an interface of the vendor system, the recurring order of the customer based on the order recommendation.

7. A method comprising:

executing, by one or more processors, to perform operations comprising:

accessing a recommendation model (i) trained using a set of transaction data, comprising order prices, order quantities, and order frequencies for a product ordered by a plurality of customers, as a training data set (ii) trained to identify, for a vendor of a plurality of vendors, quantities and frequencies for recurring orders that result in lower prices from the vendor;

receiving a recurring order of a customer, the recurring order comprising a customer-approved frequency of the recurring order, a customer-approved quantity of the product, and a customer-approved price per unit of the product;

inputting the recurring order into the recommendation model to determine an order recommendation comprising (i) the customer-approved frequency as a recommended frequency and (ii) a recommended quantity and a recommended price, different from the customer-approved price in the recurring order, for each instance of a modified recurring order; and in place of the recurring order, transmitting, to a vendor system associated with the vendor, the modified recurring order comprising the recommended frequency, the recommended quantity, and the recommended price different from the customer-approved price in the recurring order, and receiving, from the vendor, an approval for the modified recurring order.

8. The method of claim 7, the operations further comprising:

in response to (i) transmitting the modified recurring order to the vendor system and (ii) detecting processing of a transaction event for the recurring order, blocking the transaction event to prevent the processing of the transaction event from completing.

9. The method of claim 7, the operations further comprising:

in response to (i) transmitting the modified recurring order to the vendor system and (ii) detecting processing of a transaction event for the recurring order, initiating a hold on the transaction event to temporarily pause the processing of the transaction event.

10. The method of claim 7, wherein determining the order recommendation comprises:

invoke the recommendation model to compare the recurring order of the product with the set of transaction data; and determine a bulk discount is available based on the comparing, wherein the bulk discount is available for a set of circumstances.

11. The method of claim 10, further comprising:

determine that the order recommendation satisfies the set of circumstances to achieve the bulk discount, wherein a previous order of the customer has not satisfied the set of circumstances.

12. The method of claim 7, wherein transmitting the modified recurring order comprises:

automatically modify, via an interface of the vendor system, the recurring order of the product based on the order recommendation.

13. The method of claim 7, wherein generating the order recommendation comprises generating the order recommendation comprising (i) the recommended quantity different from the customer-approved quantity in the recurring order and (ii) the recommended price different from the customer-approved price in the recurring order.

14. The method of claim 7, wherein transmitting the modified recurring order comprises transmitting the modified recurring order to the vendor system in place of both the recurring order of the customer and an other order of an other customer.

15. One or more non-transitory computer-readable media storing instructions that, when executed by one or more processors, cause operations:

accessing a recommendation model (i) trained using transaction data, comprising order prices, order quantities, and order frequencies for a product ordered by a plurality of customers, as a training data set (ii) trained to identify, for a vendor of a plurality of vendors, quantities and frequencies for recurring orders that result in lower prices from the vendor;

receiving a recurring order of a customer, the recurring order comprising a customer-approved frequency of the recurring order, a customer-approved quantity of the product, and a customer-approved price per unit of the product;

generating, via the recommendation model, based on the recurring order, an order recommendation comprising (i) the customer-approved quantity as a recommended quantity and (ii) a recommended frequency and a recommended price, different from the customer-approved price in the recurring order, for each instance of a modified recurring order; and transmitting, to the vendor, the modified recurring order comprising the recommended quantity, the recommended frequency, and the recommended price different from the customer-approved price in the recurring order.

16. The one or more non-transitory computer-readable media of claim 15, the operations further comprising:

in response to (i) transmitting the modified recurring order to the vendor and (ii) detecting processing of a transaction event for the recurring order, blocking the transaction event to prevent the processing of the transaction event from completing.

17. The one or more non-transitory computer-readable media of claim 15, the operations further comprising:

in response to (i) transmitting the modified recurring order to the vendor and (ii) detecting processing of a transaction event for the recurring order, initiating a hold on the transaction event to temporarily pause the processing of the transaction event.

18. The one or more non-transitory computer-readable media of claim 15, wherein transmitting the modified recurring order to the vendor comprises:

interfacing with a vendor system to replace the recurring order with the modified recurring order.

19. The one or more non-transitory computer-readable media of claim 15, wherein generating the order recommendation comprises generating the order recommendation comprising (i) the recommended frequency different from the customer-approved frequency in the recurring order and (ii) the recommended price different from the customer-approved price in the recurring order.

* * * * *